(12) United States Patent
Wang et al.

(10) Patent No.: US 12,335,069 B2
(45) Date of Patent: Jun. 17, 2025

(54) DIFFERENTIAL TRANSMISSION LINE HAVING HIGH ISOLATION AND CONFIGURATION METHOD THEREOF

(71) Applicant: ELECTRONICS AND TELECOMMUNICATIONS RESEARCH INSTITUTE, Daejeon (KR)

(72) Inventors: Seung Hun Wang, Daejeon (KR); Sun Woo Kong, Daejeon (KR); Bong Hyuk Park, Daejeon (KR); Hui Dong Lee, Daejeon (KR); Seung Hyun Jang, Daejeon (KR); Seok Bong Hyun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 243 days.

(21) Appl. No.: 18/059,197

(22) Filed: Nov. 28, 2022

(65) Prior Publication Data
US 2023/0224191 A1 Jul. 13, 2023

(30) Foreign Application Priority Data

Jan. 11, 2022 (KR) .................. 10-2022-0004149
Sep. 6, 2022 (KR) .................. 10-2022-0113009

(51) Int. Cl.
*H01P 1/15* (2006.01)
*H01P 1/383* (2006.01)
*H04L 25/02* (2006.01)

(52) U.S. Cl.
CPC ............ *H04L 25/0272* (2013.01); *H01P 1/15* (2013.01); *H01P 1/383* (2013.01)

(58) Field of Classification Search
CPC ............ H04L 25/0272; H04L 25/0264; H04L 25/0278; H01P 1/15; H01P 1/165; H01P 1/18; H01P 3/00
(Continued)

(56) References Cited

U.S. PATENT DOCUMENTS 7,068,104 B2    6/2006  Burns
7,885,629 B2    2/2011  Ojo
(Continued)

FOREIGN PATENT DOCUMENTS

KR    10-2010-0045751 A    5/2010
KR    10-1855037 B1    5/2018
(Continued)

*Primary Examiner* — Hai L Nguyen

(57) ABSTRACT

A differential transmission line having a switch may comprise: a first transmission line comprising a first distribution element having a first impedance; a second transmission line comprising a second distribution element having a second impedance; and a first switch block connected between a first end of the first transmission line and a first end of the second transmission line, wherein the first switch block comprises a first switch connected in series to the first end of the first transmission line, a second switch connected in series to the first end of the second transmission line, a first-cross capacitor connected between a first terminal of the first switch and a second terminal of the second switch, and a second cross-capacitor connected between a first terminal of the second switch and a second terminal of the first switch.

5 Claims, 12 Drawing Sheets

(58) Field of Classification Search
USPC .......................................................... 333/262
See application file for complete search history.

(56) References Cited

U.S. PATENT DOCUMENTS

| | | | |
|---|---|---|---|
| 8,040,200 B2 | 10/2011 | Minegishi | |
| 9,450,557 B2 | 9/2016 | Reiha | |
| 10,734,972 B1 * | 8/2020 | Lin | H03H 11/20 |
| 2024/0223408 A1 * | 7/2024 | Wang | H04B 3/02 |

FOREIGN PATENT DOCUMENTS

| KR | 10-2018-0124578 A | 11/2018 |
|---|---|---|
| KR | 10-2045498 B1 | 11/2019 |
| KR | 10-2319440 B1 | 11/2021 |

* cited by examiner

DIFFERENTIAL TRANSMISSION LINE HAVING HIGH ISOLATION AND CONFIGURATION METHOD THEREOF

CROSS-REFERENCE TO RELATED APPLICATIONS

This application claims priority to Korean Patent Applications No. 10-2022-0004149, filed on Jan. 11, 2022, and No. 10-2022-0113009, filed on Sep. 6, 2022 with the Korean Intellectual Property Office (KIPO), the entire contents of which are hereby incorporated by reference.

BACKGROUND

1. Technical Field

The present disclosure relates to a differential transmission line for use in a radio frequency integrated circuit for a high-frequency system, and more particularly, to a differential transmission line having a high isolation and a configuration method thereof.

2. Related Art

Recently, millimeter wave band radio communication has been drawing attention as a technology to tackle the bandwidth constraints in the frequency domain for existing communication systems. With the diversification of functions required in the next-generation communication system, the demand for reconfigurable circuits such as a phase shifter applicable to an integrated circuit supporting multi-band and multi-mode or a phased array system has increased, and these circuits are configured to be used along with transmission line switches.

The transmission line serves to transmit a signal and performs impedance matching between a source on the signal input side and a load on the signal output side. Particularly, a ¼ lambda (λ) transmission line is capable of changing the phase by 180° based on the characteristic impedance on the Smith chart. Because this characteristic can show a short state as an Open State and an Open State as a Short State in the Radio Frequency (RF) Domain, the ¼ lambda transmission line is used to configure a switch as a circuit or to construct a power divider such as a Wilkinson divider.

Of course, transmission lines with lengths such as ⅛ lambda and 1/16 lambda are frequently used to construct high-frequency circuits because they also have a capability of only changing the phase suitable for respective electrical lengths while maintaining a constant voltage standing wave (VWR) based on the characteristic impedance.

Meanwhile, a known method of securing isolation of the switch in the transmission line is to add an inductor. This method of securing isolation of the switch has drawbacks of increase in component size and circuit complexity due to the addition of the inductor and impact to the junction node due to the low isolation.

Particularly, the transmission line equipped with a switch for use in the millimeter wave band has a drawback in that the signal leakage caused by parasitic capacitance during the turn-off of the switch makes it difficult to achieve a high degree of isolation.

SUMMARY

The present disclosure has been conceived to solve the problems of the conventional technologies, and it is an object of the present disclosure to provide a differential transmission line capable of isolating nodes at both ends of the differential transmission line with a high isolation.

It is another object of the present disclosure to provide a differential transmission line and a configuration method thereof capable of ensuring a high isolation without impact to the nodes connected to both ends of the switch as well as simple in configuration and small in component size, compared to the existing method of securing the isolation of the switch by adding an inductor, by using the cross-coupled capacitance as a capacitor required to construct a differential transmission line while ensuring the isolation of the switch.

It is still another object of the present disclosure to provide a differential transmission line and a communication module using the same that are capable of improving the isolation in the separation mode over a wide bandwidth while having a small size without an increase in insertion loss compared to the existing one through a simple structure.

According to a first exemplary embodiment of the present disclosure, a differential transmission line having a switch may comprise: a first transmission line comprising a first distribution element having a first impedance; a second transmission line comprising a second distribution element having a second impedance; and a first switch block connected between a first end of the first transmission line and a first end of the second transmission line, wherein the first switch block comprises a first switch connected in series to the first end of the first transmission line, a second switch connected in series to the first end of the second transmission line, a first-cross capacitor connected between a first terminal of the first switch and a second terminal of the second switch, and a second cross-capacitor connected between a first terminal of the second switch and a second terminal of the first switch.

A control terminal of the first switch and a control terminal of the second switch may be commonly connected to a power supply voltage terminal.

A body part of the first switch or the second switch may be connected to the ground or a power supply voltage according to type of a transistor constituting the switch.

The differential transmission line may further comprise a first capacitor connected between the second end of the first transmission line and the second end of the second transmission line.

The differential transmission line may further comprise a second switch block connected between the second end of the first transmission line and the second end of the second transmission line, wherein the second switch block is identical in configuration to the first switch block.

The differential transmission line may further comprise a first capacitor connected between the second end of the first transmission line and the second end of the second transmission line.

The differential transmission line may further comprise a second capacitor connected in parallel between the first end of the first transmission line and the first end of the second transmission line between the first and second transmission lines and the first switch block.

According to a second exemplary embodiment of the present disclosure, a method for configuring a differential transmission having a switch may comprise: connecting a first switch in series to a first end of a first transmission line including a first distribution element having a first impedance; connecting a second switch in series to a first end of a second transmission line including a second distribution element having a second impedance; connecting a third switch between a first terminal of the first switch and a second terminal of the second switch; and connecting a fourth switch between a first terminal of the second switch and a second terminal of the first switch, wherein a first pair of the first and second switches and a second pair of the third and fourth switches are connected in a cross-coupled pair to cancel each other's off-capacitance.

The method may further comprise connecting control terminals of the switches of the first pair and control terminals of the switches of the second pair commonly to a power supply voltage terminal, respectively.

The method may further comprise connecting a body part of one or more switches among the first to fourth switches to the ground or a power supply voltage depending on the type of a transistor constituting the corresponding switch.

The first and second distribution elements may be series inductors having a length of a predetermined ratio of a wavelength of a radio frequency.

The differential transmission line may be used for a phase shifter including a transmission line requiring a switch operation or used for a radio frequency (RF) front-end module including the phase shifter.

According to a third exemplary embodiment of the present disclosure, a differential transmission line may comprise: a first transmission line comprising a first distribution element having a first impedance; a second transmission line comprising a second distribution element having a second impedance; and a first switch block cross-connected between a first end of the first transmission line and a first end of the second transmission line, wherein the first switch block comprises a first switch block connected in series to the first end of the first transmission line, a second switch connected in series to the first end of the second transmission line, a first cross-coupling element connected between a first terminal of the first switch and a second terminal of the second switch, and a second cross-coupling element connected between a first terminal of the second switch and a second terminal of the first switch.

The first and second cross-coupling elements may be cross-capacitors or semiconductor switches.

A body part of the first switch or the second switch may be connected to the ground or connected to a power supply voltage depending on the type of transistor constituting the switch.

The differential transmission line may further comprise a first capacitor connected between a second end of the first transmission line and a second end of the second transmission line.

The differential transmission line may further comprise a second switch block connected between a second end of the first transmission line and a second end of the second transmission line, wherein the second switch block is identical in configuration to the first switch block.

The differential transmission line may further comprise a first capacitor connected between a second end of the first transmission line and a second end of the second transmission line.

The differential transmission line may further comprise a second capacitor connected in parallel between the first ends of the first and second transmission lines between the first and second transmission lines and the first switch block.

The differential transmission line may be connected to a phase shifter or a front-end module (FEM).

According to the above-described configuration of the present disclosure, it is possible to provide a transmission line having a high isolation using a cross-coupled capacitor-based switch structure, which is simpler and smaller than the existing switch utilizing an inductor to ensure isolation, in such a way as to cancel, when the switch is off, the parasitic off capacitance to secure the isolation and to use the shunt capacitance, seen when the switch is on, as a capacitor in the C-L-C structure consisting of shunt capacitors and series inductors.

In addition, according to the present disclosure, it is possible to easily implement a differential transmission line, without using an additional inductor for reducing insertion loss or offsetting a switch-off capacitance when constructing the transmission line requiring a switch operation, by exploiting the capacitance constituting the differential transmission line composed of C-L-C lumped elements as a cross-coupled capacitor pair to cancel the switch-off capacitance $C_{ofr}$ of the series switch. By using such a differential transmission line, it is possible solve the existing problem in that the frequency band in which the existing inductor can cancel the capacitance is limited and has a narrow bandwidth.

In addition, according to the present disclosure, it is possible to effectively implement a switch-embedded differential transmission line having a high isolation even with a small size as well as having no additional damage to insertion loss due to its simple structure, resulting in an advantage of being capable of being actively and effectively utilized in high-frequency applications or reconfigurable circuit designs requiring a high isolation from a parent circuit in a phase shifter or a front-end module (FEM).

DETAILED DESCRIPTION OF THE EMBODIMENTS

Figure 1:
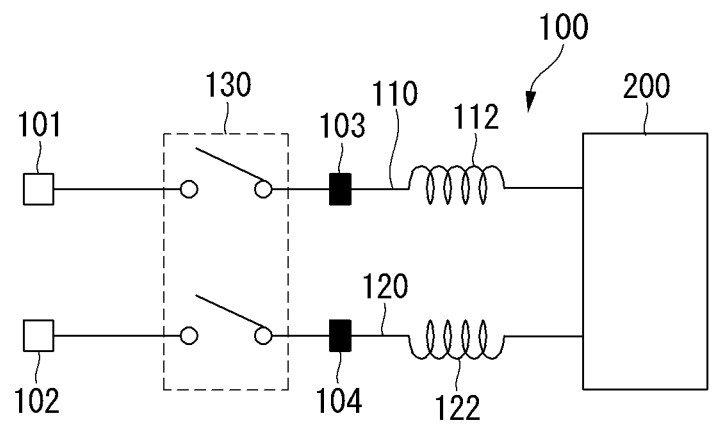
FIG. 1 is a schematic circuit diagram illustrating a differential transmission line having a switch according to an embodiment of the present disclosure.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail Referring to the accompanying drawings. In describing the disclosure, to facilitate the entire understanding of the disclosure, like numbers refer to like elements throughout the description of the figures and the repetitive description thereof will be omitted.

Figure 2:
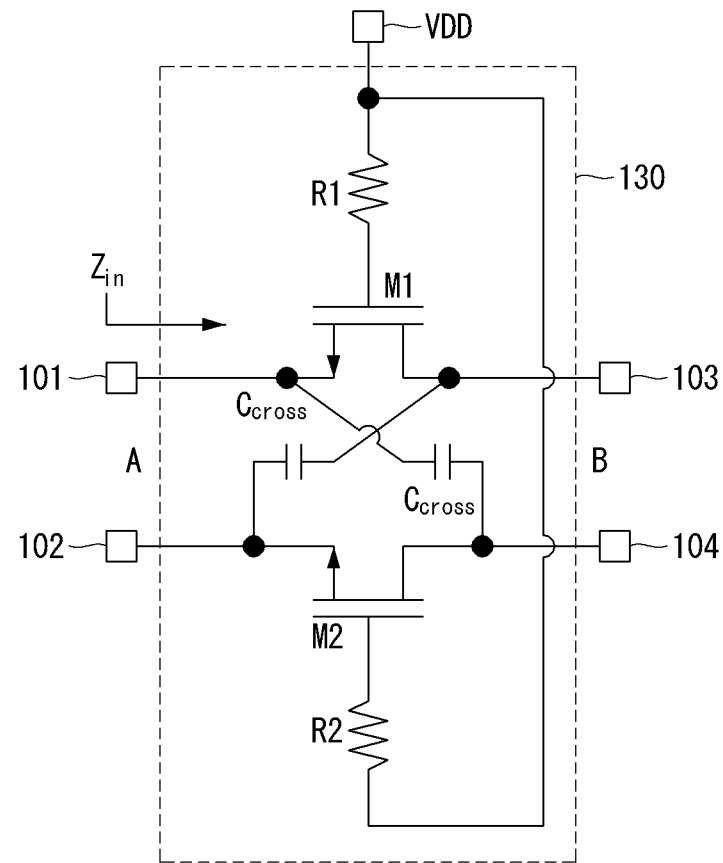
FIG. 2 is a circuit diagram illustrating a configuration of a switch employable to the differential transmission line of FIG. 1.

FIG. 1 is a schematic circuit diagram illustrating a differential transmission line having a switch according to an embodiment of the present disclosure, and FIG. 2 is a circuit diagram illustrating a configuration of a switch employable to the differential transmission line of FIG. 1.

Referring to FIG. 1, the differential transmission line 100 includes a first transmission line 110, a second transmission line 120, and a switch block 130. The switch block 130 is connected in series between the first end of the first transmission line 110 and the first end of the second transmission line 120.

The first transmission line 110 may include a first distribution element 112 having a first impedance. The first impedance includes a predetermined characteristic impedance, and the first distribution element 112 includes a waveguide or transmission line in which circuit constants may be regarded as distributed in the longitudinal direction of the line. The transmission line may include a microstrip line.

The second transmission line 120 may include a second distribution element 122 having a second impedance. The second impedance may include a predetermined characteristic impedance and may be identical to or different from the first impedance. The second distribution element 122 includes a waveguide or transmission line in which circuit constants may be regarded as distributed in the lengthwise direction of the line. The transmission line may include a microstrip line.

The first and second transmission lines 110 and 120 may be connected at their second ends 103 and 104 opposite to their first ends 101 and 102 to a communication component 200 such as an antenna or other communication modules.

As shown in FIG. 2, the switch block 130 is provided with a first switch M1 connected in series to the first end 101 of the first transmission line 110, a second switch M2 connected in series to the first end 102 of the second transmission line 120, a first cross capacitor $C_{cross}$ connected between the first terminal of the first switch M1 and the second terminal of the second switch M2, and a second cross capacitor $C_{cross}$ connected between the second terminal of the first switch M1 and the first terminal of the second switch M2.

The first terminal of the first switch M1 may be connected to the first end 101, and a second terminal of the first switch M1 may be connected to the second end 103. In addition, the first terminal of the second switch M2 may be connected to another first end 102, and the second terminal of the second switch M2 may be connected to another second end 104.

The control terminal of the first switch M1 is connected to the power supply voltage VDD through the first resistor R1, and the control terminal of the second switch M2 is connected to the power supply voltage VDD through the second resistor R2. Depending on the type of the switch, the control terminal of each switch may also be connected to the ground or another power supply voltage. Another power supply voltage may have a voltage level lower than the power supply voltage VDD by a predetermined level and may be referred to as VSS or the like. The first and second switches M1 and M2 may include thin film transistors.

Figure 3A:
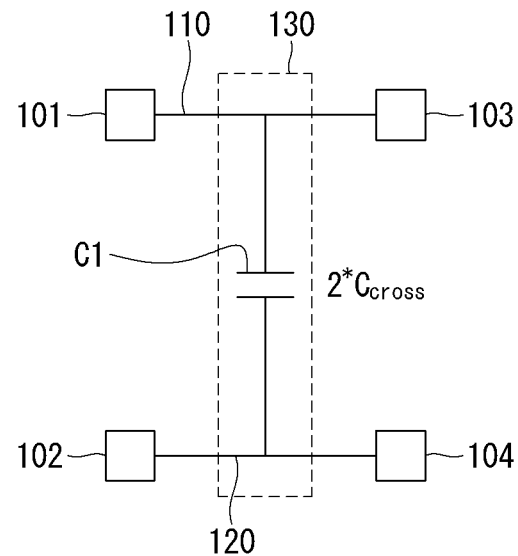
FIGS. 3A and 3B are diagrams illustrating an operation state of the switch of FIG. 2.
Figure 3B:
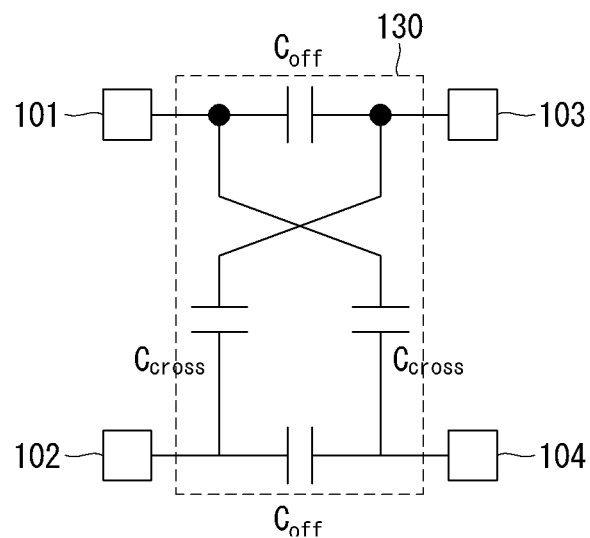

FIGS. 3A and 3B are diagrams illustrating an operation state of the switch of FIG. 2.

Referring to FIG. 3A, the switch block 130 may be configured such that the a shunt capacitor C1 of double cross capacitance $2*C_{cross}$ between the first and second transmission lines 110 and 120 to function as the capacitance C of a lumped C-L-C element on one side of a transmission line when the first and second switches M1 and M2 are turned on according to the voltage level or current level of VDD in the switch block 130.

In addition, when the first and second switches M1 and M2 are turned off according to the voltage level or current level of VDD in the switch block 130, the switch block 130 is set to have two cross capacitances $C_{cross}$ and two switch-off capacitances $C_{off}$.

That is, as shown in FIG. 3B, the switch block 130 may be configured in the form of an equivalent circuit including a switch-off capacitance $C_{off}$ formed at the position of the first switch (refer to M1 in FIG. 2), another switch-off capacitance $C_{off}$ formed at the position of the second switch (refer to M2 in FIG. 2), a cross capacitance $C_{cross}$ formed between the first terminal of the first switch and the second terminal of the second switch, and another cross capacitance $C_{cross}$ formed between the second terminal of the first switch and the first terminal of the second switch.

In this way, when the first and second switches M1 and M2 of the switch block 130 are turned off, the switch-off capacitance, which is a parasitic component generated in each switch, is canceled by the cross capacitance such that that the impedance at one end when viewed from the other end or the impedance at the other end when viewed from one end of the switch has a very large value, resulting in very high isolation between the both ends of the switch.

According to the present embodiment, it is possible to configure the differential transmission line such that there is little influence between the different circuits connected to both ends of the switch block 130 when the switch block is opened. That is, when viewed from one circuit, the other circuit can be treated as if there is no transmission line at the node from the beginning and, conversely, when viewed from the other circuit, the opposite side circuit may be treated as if there is no transmission line at the node from the beginning.

To this end, in the present embodiment, it is possible to obtain the cross capacitance required to form the transmission line and determine the size of the switches (refer to M1 and M2 in FIG. 2) in order for the double cross capacitance to properly cancel the switch-off capacitance.

Figure 4:
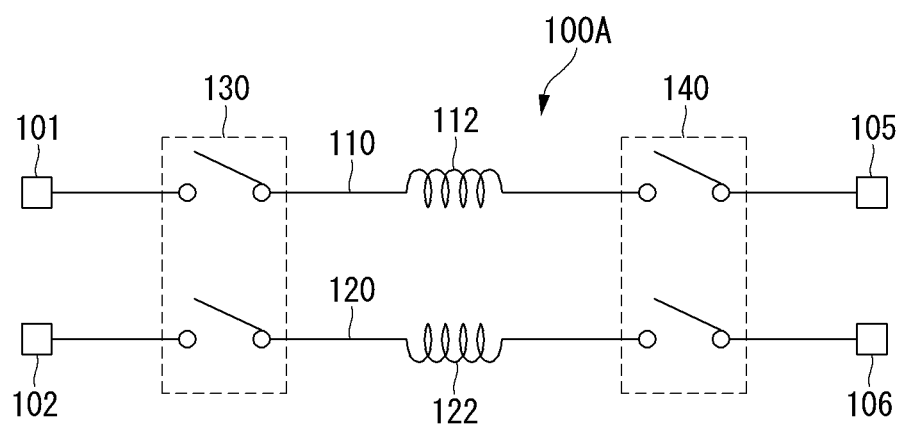
FIG. 4 is a schematic circuit diagram illustrating a differential transmission line having a switch according to another embodiment of the present disclosure.

FIG. 4 is a schematic circuit diagram illustrating a differential transmission line having a switch according to another embodiment of the present disclosure.

Referring to FIG. 4, the differential transmission line 100A includes a first transmission line 110, a second transmission line 120, a first switch block 130, and a second switch block 140. The switch block 130 is connected in series between the first end of the first transmission line 110 and the first end of the second transmission line 120. The switch block 140 is connected in series between the second end of the first transmission line 110 and the second end of the second transmission line 120.

That is, the differential transmission line 100A may have a circuit structure in which a first distribution element 112 is disposed in the form of a series connected in the middle of the first transmission line 110 between the other end of the first switch block 130 and the one end of the second switch block 140 and a second distribution element 122 is disposed in the form of a series connected in the middle of the second transmission line 120. Here, the first ends 101 and 102 of the first and second transmission lines 110 and 120 may be positioned at one end of the first switch block 130, and the second ends 105 and 106 of the first and second transmission links 110 and 120 may be positioned at the other end of the first switch block 130.

Compared to the case of using a single transmission line, the above-described differential transmission line including the first and second transmission lines is capable of lowering electro-magnetic interference (EMI) emission and facilitating cancelation of common mode noise and application to the interface of gigahertz (GHz) high-speed processing hardware. In particular, it is possible to apply to signal transmission standards such as low voltage differential signaling (LVDS) and ground LVDS (GLVDS) to ensure a high degree of isolation between both ends of the switch through the switch block 130 to be described later along with low power consumption characteristic.

The first and second switch blocks 130 and 140 may each be substantially identical in configuration and function to the switch block described above Referring to FIG. 2.

Figure 5A:
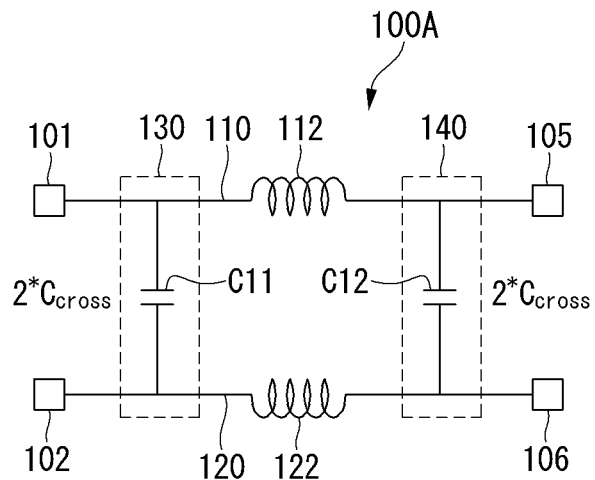
FIGS. 5A and 5B are equivalent circuit diagrams illustrating an operation state according to switch on/off of the differential transmission line of FIG. 4.
Figure 5B:
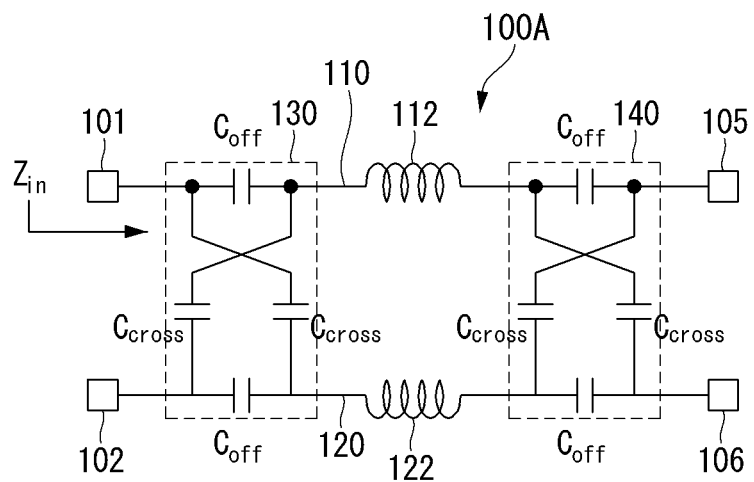

FIGS. 5A and 5B are equivalent circuit diagrams illustrating an operation state according to switch on/off of the differential transmission line of FIG. 4.

Referring to FIG. 5A, each of the switch blocks 130 and 140 may be configured such that the a shunt capacitor C1 of double cross capacitance ($2*C_{cross}$) between the first and second transmission lines 110 and 120 to function as the capacitance C of a lumped C-L-C element on each of both sides of the transmission line when the first and second switches M1 and M2 are turned on according to the voltage level or current level of VDD in each of the first and second switch blocks 130 and 140 of the differential transmission line 100A.

In addition, Referring to FIG. 5B when the first and second switches M1 and M2 of the differential transmission line 100A are turned off according to the voltage level or current level of VDD in each of the switch blocks 130 and 140, each of the switch blocks 130 and 140 is set to have two cross capacitances $C_{cross}$ and two switch-off capacitances $C_{off}$. That is, each of the switch blocks 130 and 140 may be configured in the form of an equivalent circuit including a switch-off capacitance $C_{off}$ formed at the position of the first switch (refer to M1 in FIG. 2), another switch-off capacitance $C_{off}$ formed at the position of the second switch (refer to M2 in FIG. 2), a cross capacitance $C_{cross}$ formed between the first terminal of the first switch and the second terminal of the second switch, and another cross capacitance $C_{cross}$ formed between the second terminal of the first switch and the first terminal of the second switch.

In this way, when the first and second switches M1 and M2 of each of the switch blocks 130 and 140 are turned off, the switch-off capacitance, which is a parasitic component generated in each switch, is canceled by the cross capacitance such that that the impedance at one end when viewed from the other end or the impedance at the other end when viewed from one end of the switch has a very large value, resulting in very high isolation between the both ends of the switch.

To this end, in differential transmission line 100A of the present embodiment, it is possible to obtain the cross capacitance required to configure the differential transmission line and determine the size of the switches (refer to M1 and M2 in FIG. 2) in order for the double cross capacitance to properly cancel the switch-off capacitance.

In addition, the differential transmission line 100A of the present embodiment may be configured to use only as much the cross capacitance as capable of canceling the switch-off capacitance at a predetermined switch size.

According to the present embodiment, it is possible to configure the differential transmission line such that there is little influence between the different circuits connected to both ends of each of the switch blocks 130 and 140 when two switches of each switch block are turned off. That is, in the structure of the differential transmission line 100A with the switches according to the present embodiment, when viewed from one circuit centered on each switch, the other circuit can be treated as if there is no transmission line at the node from the beginning and, conversely, when viewed from the other circuit, the opposite side circuit may be treated as if there is no transmission line at the node from the beginning.

Meanwhile, it is possible to add an additional parallel capacitance available for configuration of the differential transmission line to at least one or both of the two opposite ends of the switch. In addition, when a switch block is connected to one end of the switch and a parallel capacitance is added to the other end of the switch, another switch block may be selectively installed at the rear end of the parallel capacitance at the other end of the switch.

Figure 6:
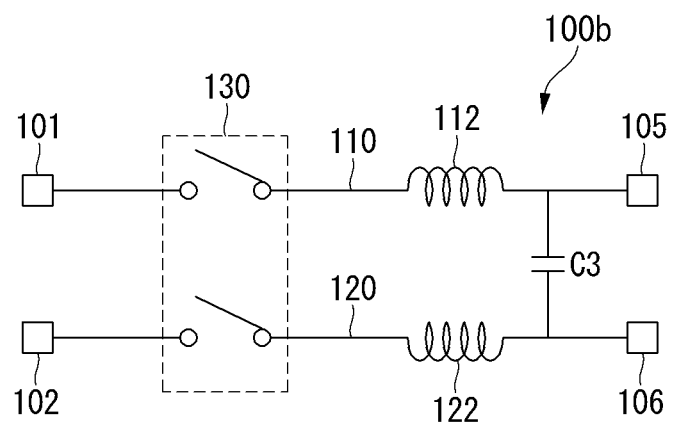
FIG. 6 is a schematic circuit diagram illustrating a differential transmission line having a switch according to another embodiment of the present disclosure.

FIG. 6 is a schematic circuit diagram illustrating a differential transmission line having a switch according to another embodiment of the present disclosure.

Referring to FIG. 6, the differential transmission line 100A includes a first transmission line 110, a second transmission line 120, a first switch block 130, and a capacitor C3. The capacitor C3 may be referred to as a third capacitor to distinguish it from capacitors in other embodiments.

The differential transmission line 100B may be configured such that a first distribution element 112 connected in series in the middle of the first transmission line 110 is positioned between the other end of the first switch block 130 and one terminal (hereinafter, referred to as the first terminal) of the third capacitor C3, and a second distribution element 122 connected in series in the middle of the second transmission line 120 is positioned between the other end of the first switch block 130 and the other terminal (hereinafter, referred to as the second terminal) of the third capacitor C3.

Here, the first end 101 of the first transmission line 110 and the first end 102 of the second transmission line 120 are positioned at one end of the first switch block 130. In addition, the second end 150 of the first transmission line 110 is positioned at the first terminal of the third capacitor C3, and the second end 106 of the second transmission line 120 may be positioned at the second terminal of the third capacitor C3.

The above-described first switch block 130 may be identical in configuration and function to the switch block described Referring to FIG. 2.

According to the present embodiment, the differential transmission line 100B may be configured in such a way that the switch block 130 is selectively used only on one side requiring a high degree of isolation among both ends of the differential transmission line. In this case, when the switches of the switch block 130 are turned off, the impedance in the direction viewed from the left side of FIG. 6 toward the differential transmission line 100B becomes so large that the transmission line can be effectively isolated from the left node. In addition, the reduction in number of switches used in the differential transmission line 100B may improve insertion loss may be mitigated.

Figure 7:
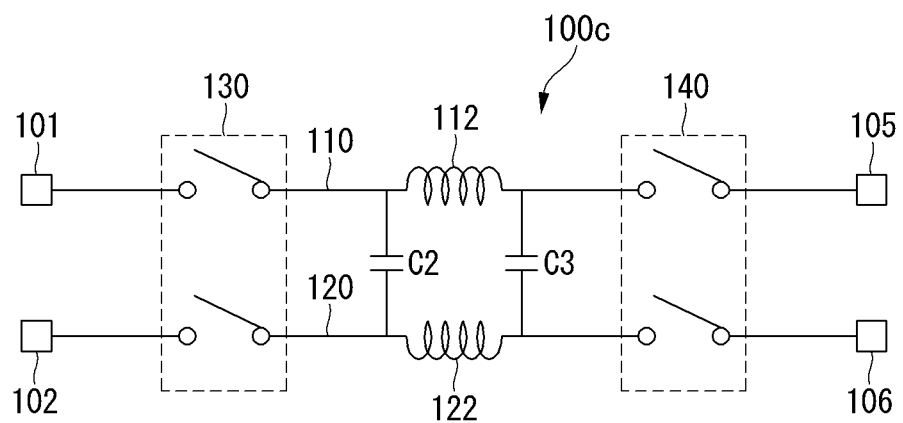
FIG. 7 is a schematic circuit diagram illustrating a differential transmission line having switches according to another embodiment of the present disclosure.

FIG. 7 is a schematic circuit diagram illustrating a differential transmission line having switches according to another embodiment of the present disclosure.

Referring to FIG. 7, the differential transmission line 100C includes a first transmission line 110, a second transmission line 120, a first switch block 130, a second switch block 140, a second capacitor C2 and a third capacity C3.

In the configuration of the differential transmission line 100C, the first distribution element 112 is positioned in the middle of the first transmission line 110 and the second distribution element 122 is position in the middle of the second transmission line 120 between the other end of the first switch block 130 and one end of the second switch block 140. In addition, the second capacitor C2 is connected at its both ends to the first node between the other end of the first switch block 130 and one end of the first distribution element 112 and the second node between the other end of the first switch block 130 and one end of the second distribution element 122. In addition, the third capacitor C3 is connected at its both ends to the third node between the other end of the first distribution element 112 and one end of the second switch block 140 and the fourth node between the other end of the second distribution element 122 and one end of the second switch block 140.

Here, the first ends 101 and 102 of the first and second transmission lines 110 and 120 may be positioned in parallel at one end of the first switch block 130, and the second ends 105 and 106 of the first and second transmission links 110 and 120 may be positioned in parallel at the other end of the second switch block 140.

The first and second switch blocks 130 and 140 may each be substantially identical in configuration and function to the switch block described above Referring to FIG. 2.

According to the present embodiment, the differential transmission line 100C may be configured in such a way as to use only as much the cross capacitance $C_{cross}$ as capable of canceling the switch-off capacitance $C_{off}$ of the switches in each of the switch blocks 130 and 140 and add the shunt capacitance such as the second and third capacitors C2 and C3 to the read end of the switch for insufficient capacitance to form the transmission line.

The above-described switch block may be referred to as a series differential switch or simply a switch. In addition, the transmission line having the above-described distribution element may be implemented as a waveguide or a microstrip line, but is not limited thereto.

Figure 8:
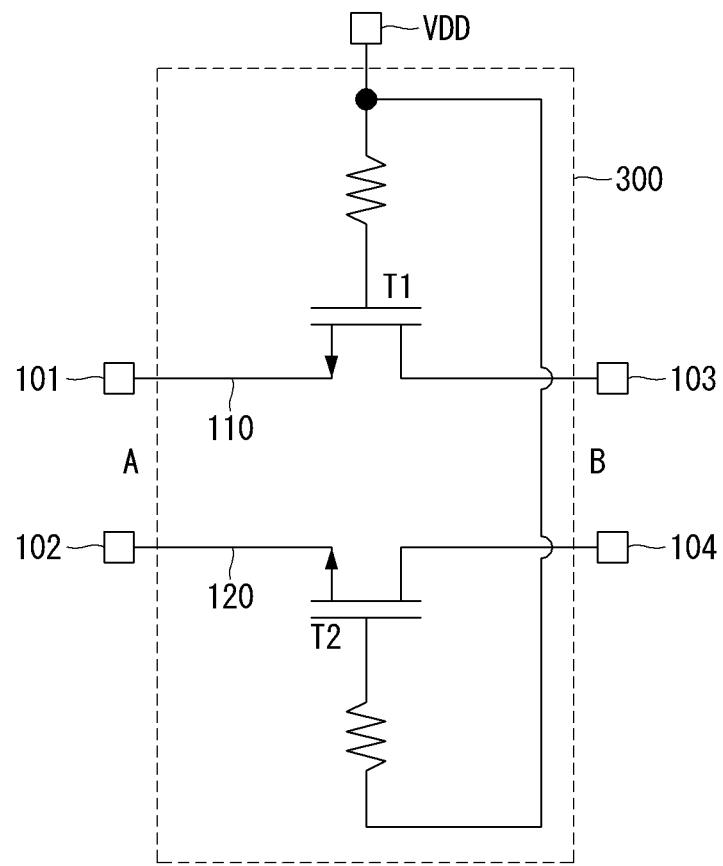
FIG. 8 is a schematic circuit diagram illustrating a series differential switch usable for a differential transmission line of a comparative example.

FIG. 8 is a schematic circuit diagram illustrating a series differential switch usable for a differential transmission line of a comparative example.

Referring to FIG. 8, the serial differential switch 300 usable for the differential transmission line of the comparative example may include a first switch T1 connected in series to the first transmission line 110 and a second switch T2 connected in series to the second transmission line 120. Here, the control terminal of the first switch T1 and the control terminal of the second switch T2 may be commonly connected to the power supply voltage VDD.

In the case of differentially configuring a C-L-C type transmission line composed of lumped elements using the aforementioned series differential switch of the comparative example (refer to the form in FIG. 7), although there is no problem when the switch is turned on, when the switch is turned off, nodes A and B nodes at both ends of the switch are not isolated from each other in the differential transmission line due to the parasitic capacitance component of the switch, which causes the impedance matching characteristics and leakage at the left and right circuit parts of the switch, i.e., the series differential switch 300 to adversely affects the isolation performance, resulting in degradation of the degree of isolation.

Meanwhile, considering that a transmission line is basically large in size, it is preferable to configure the transmission line to have a relatively small size in the integrated circuit design by using a C-L-C lumped element composed as an equivalent circuit of capacitors and inductors. In addition, in the case of configuring the transmission line differentially in an integrated circuit design, it is possible to achieve ground condition-independent performance, which is suitable for high-frequency circuits and advantageous in terms of isolation between channels in a multichannel configuration.

As such, unlike the comparative example described above, the differential transmission line of the present embodiment is capable of ensuring a high isolation degree of both ends of the switch by using a series differential switch having cross capacitance as a switch or switch block of the differential transmission line.

Figure 9:
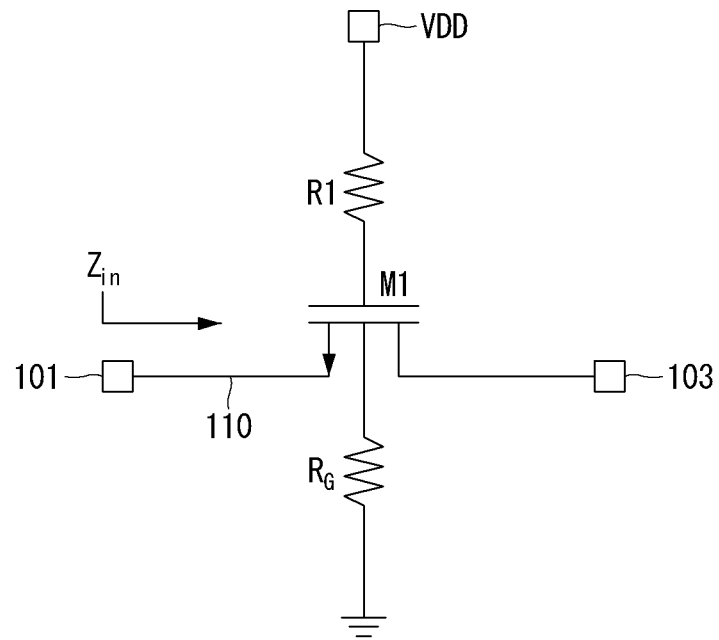
FIG. 9 is a conceptual diagram for explaining a switch structure that can be employed in a differential transmission line according to another embodiment of the present disclosure.

FIG. 9 is a conceptual diagram for explaining a switch structure that can be employed in a differential transmission line according to another embodiment of the present disclosure.

Referring to FIG. 9, the first switch M1 connected in series to the first transmission line 110 may be configured such that a body part of the first switch M1 is connected to the ground in order to mitigate insertion loss. In this case, the first switch M1 may be an N-type metal-oxide-semiconductor (NMOS) transistor. When the first switch M1 is a P-channel metal-oxide semiconductor (PMOS) transistor, the first switch M1 may be configured such that a body part of the first switch M1 is connected to the power supply voltage VDD.

As described above, in the differential transmission line of the present embodiment, it is possible to configure the differential transmission line such that the body parts of all switches in the above-described switch block are connected to the ground or connected to a high-level power supply voltage according to the type of the switch.

The above-described differential transmission line of the present embodiment may be used for a phase shifter or a high frequency (RF) band front end module (FEM) including a phase shifter, a power amplifier (PA), a low noise amplifier (LNA), and an antenna. The differential transmission line may also be used in a reconfigurable circuit including a switch and a transmission line. For example, when designing a reconfigurable circuit using a transmission line, the differential transmission line may be used to operate in such a way as to connect and disconnect the transmission line to and from a specific target node using a switch.

Figure 10:
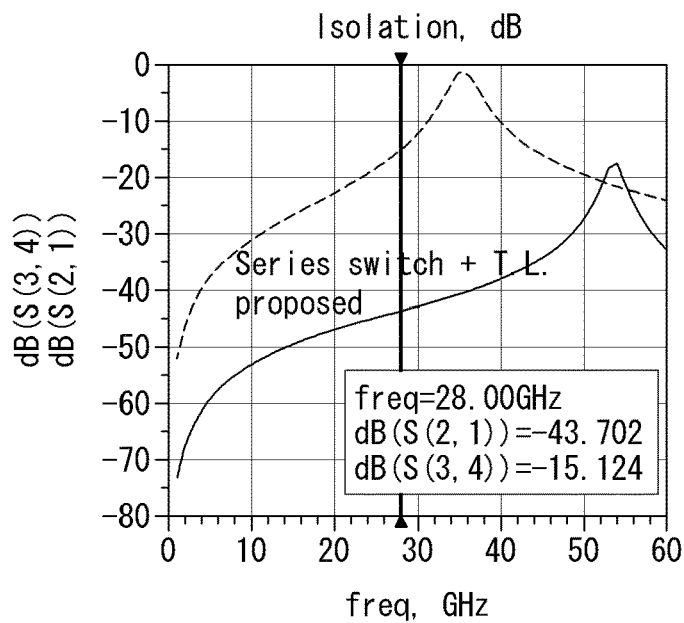
FIG. 10 is a graph illustrating simulation results for isolation degrees at both ends of the switch of the differential transmission line in the present embodiment and the comparative example.

FIG. 10 is a graph illustrating simulation results for isolation degrees at both ends of the switch of the differential transmission line in the present embodiment and the comparative example.

FIG. 10 shows a simulation result for checking a degree of isolation of both ends in a state where a port impedance of 50 ohm (Ω) is placed at the nodes of both ends of a switch and the switch is turned off. The blue graph or the dotted line graph is a simulation result for a differential transmission line of a comparative example that has an existing switch (refer to FIG. 9) and can be represented by an equivalent circuit as in FIG. 7, and the red graph or the solid line graph is a simulation result of the differential transmission line having the switch of the present embodiment described above Referring to FIG. 7. Compared to the comparative example, it is possible to identify the effect of improving the isolation by about 25 dB based on the simulation center frequency of 28 GHz.

Figure 11:
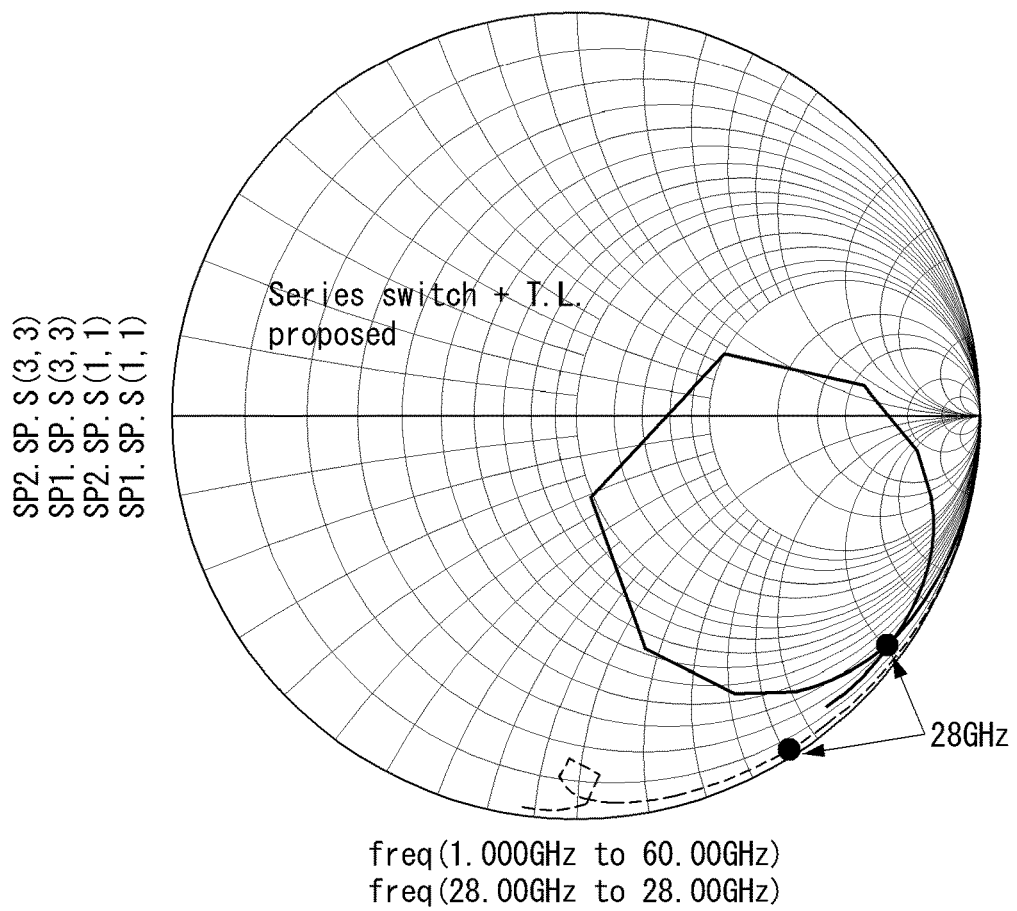
FIG. 11 is a Smith chart illustrating simulation results for the impedance of the differential transmission line of the present embodiment and the transmission line of the comparative example.

FIG. 11 is a Smith chart illustrating simulation results for the impedance of the differential transmission line of the present embodiment and the transmission line of the comparative example.

The Smith chart of FIG. 11 shows a simulation result of impedance viewed toward the transmission line when the switch is turned off under the same conditions as the simulation conditions of FIG. 10.

It is possible to identify that the reflection coefficient maintains, as can be seen from the red graph or the dotted line graph of the present embodiment, a very large value depending on the frequency in the present embodiment but changes, as can be seen from the blue graph or the solid line graph, significantly depending on the frequency near the center frequency, which shows that even if the switch is turned off, the transmission line itself may significantly affect the nodes connected to the differential transmission line.

Figure 12:
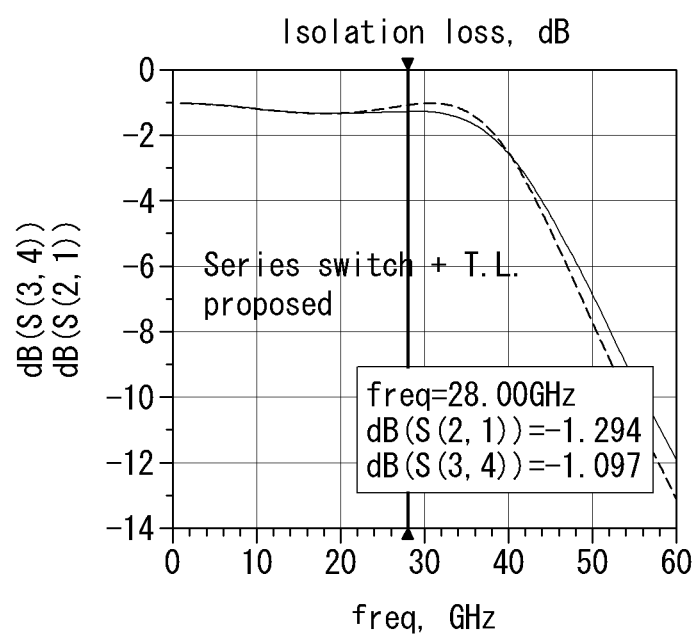
FIG. 12 is a graph illustrating a comparison result for insertion loss in a switch-on state in the simulation environment of FIGS. 10 and 11.

FIG. 12 is a graph illustrating a comparison result for insertion loss in a switch-on state in the simulation environment of FIGS. 10 and 11.

The graph of FIG. 12 shows the results of comparing the insertion loss after turning on the switch under the same conditions as the simulation conditions of FIGS. 10 and 11.

It is possible to identify that the insertion loss characteristics of the red graph or the solid line graph of the present embodiment and the blue graph or the dotted line graph of the comparative example are almost the same. This is because, in both cases, the values of the active and passive elements actually used are the same in the equivalent circuit and only the configuration method is different.

The switch described in the present embodiment may be applied to an application such as a communication module that requires the switch and a shunt capacitance when a series switch is turned on with the switch and that needs to obtain a high isolation by offsetting a short-circuit capacitance $C_{off}$ as a parasitic capacitance of the transistor forming the switch when the series switch is turned off, in the same manner as configuring the transmission line.

Figure 13:
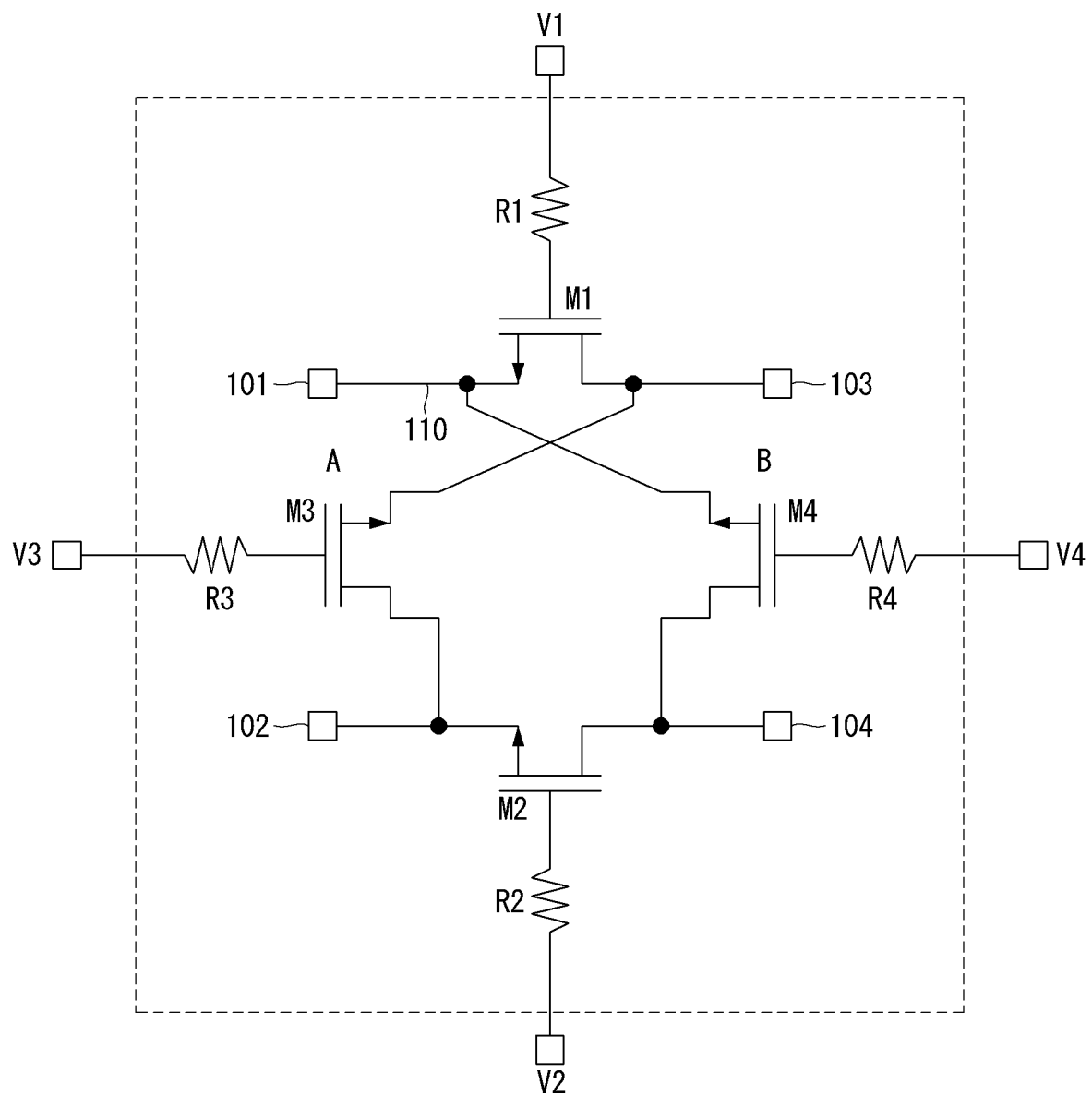
FIG. 13 is a circuit diagram illustrating a configuration of a switch that can be employed in a differential transmission line according to another embodiment of the present disclosure.
Figure 14:
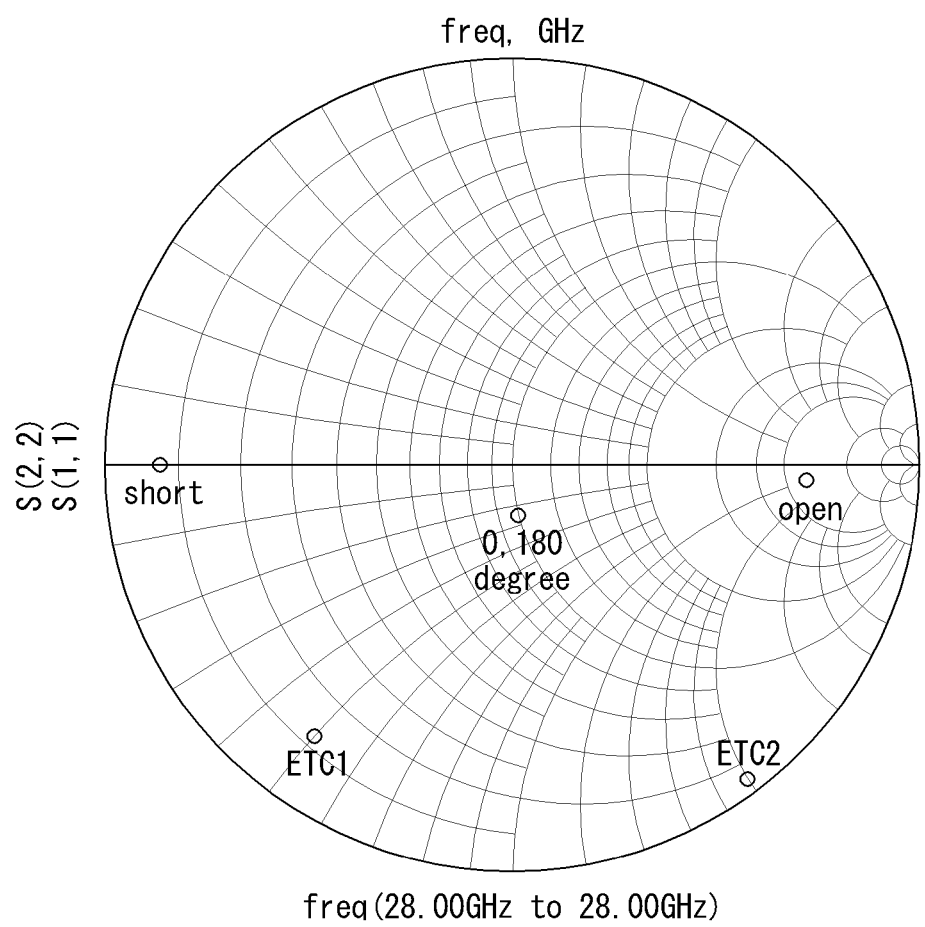
FIG. 14 is a Smith chart for explaining a line state according to the operation of the switch of FIG. 13.

FIG. 13 is a circuit diagram illustrating a configuration of a switch that can be employed in a differential transmission line according to another embodiment of the present disclosure. FIG. 14 is a Smith chart for explaining a line state according to the operation of the switch of FIG. 13.

As shown in FIG. 13, the switch block is provided with a first switch M1 connected in series to the first end 101 of the first transmission line 110, a second switch M2 connected in series to the first end 102 of the second transmission line 120, a first switch cross-connected between the first terminal of the first switch M1 and the second terminal of the second switch M2, and a fourth switch M4 cross-connected between the second terminal of the first switch M1 and the first terminal of the second switch M2.

The first terminal of the first switch M1 and the first terminal of the fourth switch M4 may be commonly connected to the first end 101, and the second terminal of the first switch M1 and the first terminal of the third switch M3 may be commonly connected to the second end 103. In addition, the first terminal of the second switch M2 and the second terminal of the third switch M3 may be commonly connected to another first end 102, and the second terminal of the second switch M2 and the second terminal of the fourth switch M4 may be commonly connected to another second end 104.

The control terminal of the first switch M1 may be connected to the first power supply voltage V1 through the first resistor R1, the control terminal of the second switch M2 may be connected to the second power supply voltage V2 through the second resistor R2, the control terminal of the third switch M3 may be connected to the third power supply voltage V3 through the third resistor R3, and the control terminal of the fourth switch M4 may be connected to the power supply voltage V4 through the fourth resistor R4. In addition, depending on the type of switch, the control terminal of each switch may be connected to the ground or a power supply voltage of another level. Another power supply voltage may have a voltage level lower than the power supply voltage VDD by a predetermined level and may be referred to as VSS or the like. The first to fourth switches M1 to M4 may be implemented as thin film transistors.

In the present embodiment, the switch structure is configured to use the off capacitance of the switch instead of the cross capacitor Cross in FIG. 2. Such a switch may be configured to use a parasitic capacitor or a parasitic capacitance of a semiconductor switch such as a metal-oxide-semiconductor field effect transistor (MOSFET).

It is possible to control the first to fourth power supply voltages V1, V2, V3, and V4 to control the state of the switch block as shown in Table 1 below.

TABLE 1

| V1 | V2 | V3 | V4 | switch block status |
|----|----|----|----|---------------------|
| 0  | 0  | 0  | 0  | open                |
| 1  | 1  | 0  | 0  | 0 degree            |
| 0  | 0  | 1  | 1  | 180 degree          |
| 1  | 1  | 1  | 1  | short               |

As shown in Table 1, the value of 0 or 1 of each power supply voltage may correspond to the strength of the voltage or the strength of the current for deactivation or activation of the corresponding switch. Activation may correspond to a turn-on level of the switch, and deactivation may correspond to a turn-off level of the switch.

For example, when the first and second switches M1 and M2 of the switch block are turned off and the third and fourth switches M3 and M4 are also turned off, the switch block is controlled to an open state. In addition, when the first and second switches M1 and M2 are turned on and the third and fourth switches M3 and M4 are turned off, the switch block can be controlled to have a phase of 0°. In addition, when the first and second switches M1 and M2 are turned off and the third and fourth switches M3 and M4 are turned on, the switch block may be controlled to have a phase of 180°. In addition, when the first and second switches M1 and M2 are turned on and the third and fourth switches M3 and M4 are also turned on, the switch block may be controlled to have a short state.

That is, as shown in FIG. 14, the switch block may be controlled to have one of the open state, 0° phase state, 180° phase state, short state, other 1 (ECT1) state, and other 2 (ECT2) state according to the operating states of the first to fourth switches by applying the first to fourth power supply voltages V1, V2, V3, and V4, respectively.

According to the present embodiment, the switch-off capacitance, which is a parasitic component generated in each switch, is offset by the parasitic capacitors of the third and fourth switches such that the impedance seen from the other end in view one end of the switch or the impedance seen from one end in view of the other end of the switch has a very large value, resulting in a very high degree of isolation between both ends of the switch.

According to the present embodiment, it is possible to configure the differential transmission line such that there is little influence between the different circuits connected to both ends of the switch block 130 when the switch block is opened. That is, when viewed from one circuit, the other circuit can be treated as if there is no transmission line at the node from the beginning and, conversely, when viewed from the other circuit, the opposite side circuit may be treated as if there is no transmission line at the node from the beginning.

The method of the present embodiment is different from the method of the other embodiment described above with the configuration in which a capacitor of a lumped element is used to offset the off capacitance of the capacitor in that a cross-coupled capacitor (cross-coupled cap.) is configured not as a lumped element but as a semiconductor switch such as a MOSFET, such that the pairs are cross-coupled to each other (cross-coupled pair) to offset the off-capacitance. A semiconductor switch or cross-capacitor may be referred to as or included in a cross-coupled element.

According to this configuration, as shown in Table 1 above, the impedance that the switch block can show according to the control voltage of each switch is capable of implementing open and short but also 180 degree under the assumption of the existing signal of 0 degree, which is advantageous in terms of implementing a phase shifter and the like.

In addition, the switch block of the present embodiment is capable of additionally expressing other impedances ECT1 and ECT2, which makes it possible to expect use in a reflection type phase shifter (RTPS).

Figure 15:
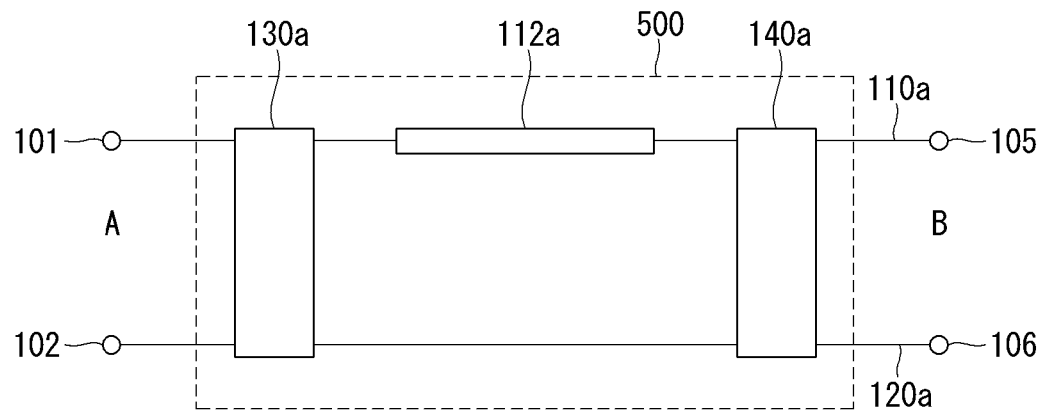
FIG. 15 is a schematic diagram illustrating a phase shifter to which a differential transmission line of the present embodiment is applicable.

FIG. 15 is a schematic diagram illustrating a phase shifter to which a differential transmission line of the present embodiment is applicable.

Referring to FIG. 15, the phase shifter 500 includes a first transmission line 110a including a microstrip line 112a, a second transmission line 120a forming a differential structure together with the first transmission line 110a, a first switch 130a connected in parallel to one end of the first transmission line 110a and one of the second transmission line 120a, and a second switch 140a connected in parallel to the other end of the first transmission line 110a and the other end of the second transmission line 120a.

The first and second switches 130a and 140a may be configured to be substantially identical in structure and function to the switch block described Referring to FIG. 2.

The phase shifter 500 of the present embodiment is capable of providing a high degree of isolation according to the operation of the first switch 130a and/or the second switch 140a between the first component connected to the A-node of one ends 101 and 102 of the first and second transmission lines 110a and 120a and the second component connected to the B-node of the other ends 105 and 106 of the first and second transmission lines 110a and 120a.

The circuit including the above-described switch and transmission line may be used as a reconfigurable circuit in an RF front-end module as well as the phase shifter.

Figure 16:
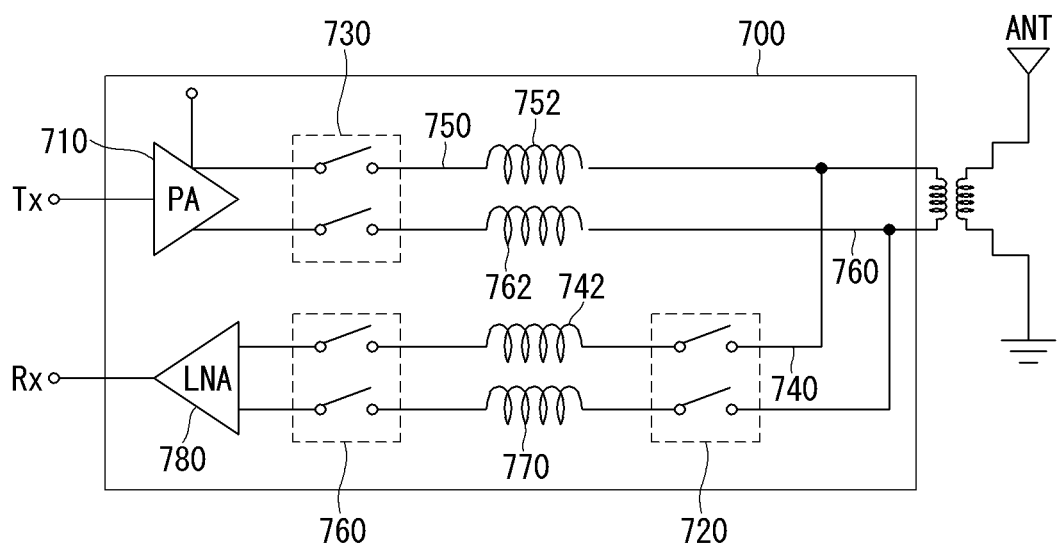
FIG. 16 is an exemplary diagram illustrating a front-end module (FEM) to which the differential transmission line of the present embodiment is applicable.

FIG. 16 is an exemplary diagram illustrating a front-end module (FEM) to which the differential transmission line of the present embodiment is applicable.

Referring to FIG. 16, the front end module 700 includes a power amplifier (PA) 710, a first switch block 730, a first transmission line 750, a second transmission line 760, a second switch block 720, a third transmission line 740, a third switch block 780, and a low noise amplifier (LNA) 790 for transmitting (Tx) and receiving (Rx) data to and from a transceiver connected to the antenna ANT. In addition, the front end module 700 may further include a balanced to unbalanced (balun) disposed in front of the antenna ANT.

In detail, the first switch block 730, the second switch block 720, and the third switch block 780 may be configured to be identical in structure and function to the switch block described above Referring to FIG. 2 or 13.

The first transmission line 750 may be provided in the middle thereof with the first inductor 752, the second transmission line 760 the second inductor 762, the third transmission line 740 the third inductor 742, and the fourth transmission line 770 the fourth inductor 772.

That is, it is possible for the combination of the first switch block 730, the first and second inductors 752 and 762, and the second switch block 720 to constitute C-L-C of the off capacitor-inductor-off capacitor to form a lumped transmission line. Similarly, it is possible for the combination of the second switch block 720, the third and fourth inductors 742 and 772, and the third switch block 780 to constitute C-L-C of the off capacitor-inductor-off capacitor to form a lumped transmission line.

These configurations make it possible, when using a transmission line as a matching network to the power amplifier (PA) 710 and the low noise amplifier (LNA) 790, to use a lumped transmission line with a switch for isolation between the transmit (TX) mode and the receive (RX) mode.

The above-described front-end module 700 may have a form in which the power amplifier 710 is omitted in a narrow sense. Such a module may be referred to as a duplexer. In addition, the front end module 700 including the power amplifier 710 may also be referred to as a transceiver. Such a transceiver may be a planar transceiver, may further include a filter or the like, and may be disposed on a printed circuit board (PCB).

Figure 17:
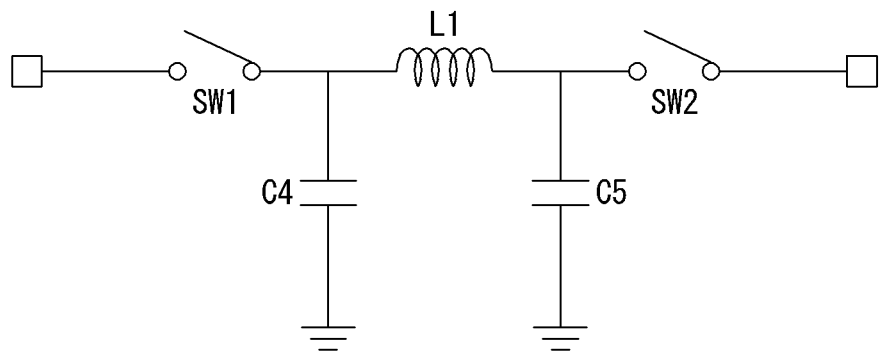
FIG. 17 is a diagram illustrating a differential transmission line of a comparative example.
Figure 18:
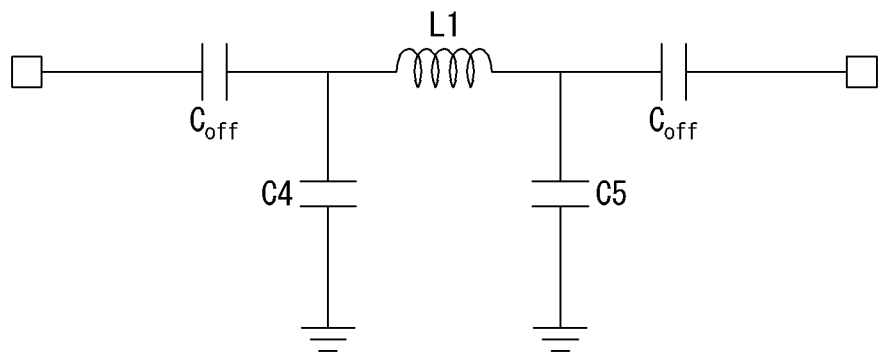
FIG. 18 is an equivalent circuit diagram for explaining a switch-off mode of the differential transmission line of FIG. 17.
Figure 19:
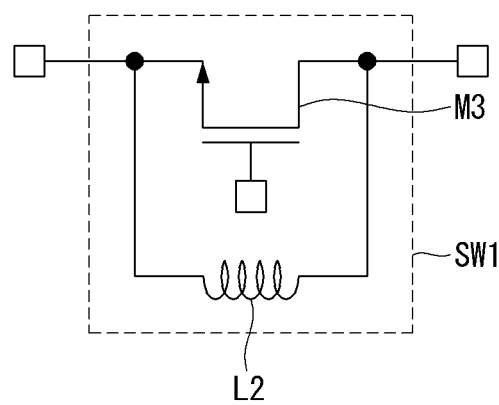
FIG. 19 is a diagram for explaining a switch structure of a comparative example available for use in the differential transmission line of FIG. 17.

FIG. 17 is a diagram illustrating a differential transmission line of a comparative example, and FIG. 18 is an equivalent circuit diagram for explaining a switch-off mode of the differential transmission line of FIG. 17. And FIG. 19 is a diagram for explaining a switch structure of a comparative example available for use in the differential transmission line of FIG. 17.

Referring to FIG. 17, the differential transmission line of the comparative example has a C-L-C type differential transmission line structure with two capacitors C4 and C5 connected in parallel to both ends of the first distribution element L1 and two switches SW1 and SW2 connected in series to both ends of the first distribution element L1.

The first distribution element L1 may include an element having an inductance component such as a microstrip line.

When the first and second switches SW1 and SW2 are in the off state, the differential transmission line may not be completely separated from an input terminal or an output terminal due to switch-off capacitance $C_{off}$ formed at positions of the first and second switches SW1 and SW2 as shown in FIG. 18 and thus may electrically affect the target node.

In order to solve the problem of the differential transmission line of the comparative example described above, a separate inductor L2 may be added to the switch M3 corresponding to the first switch SW1 or the second switch SW2 as shown in FIG. 19. Although it may offset the switch-off capacitance, adding the inductor L2 in parallel to the switch M1 may incur size and cost issues due to the large size of the inductor L2, cause additional insertion loss due to the finite quality factor (Q-factor) of the inductor L2, and limit the available bandwidth because the frequency band in which the L2 can offset the capacitance is not wide.

In particular, even when the differential transmission line of the above-described comparative example is configured as a C-L-C type transmission line composed of lumped elements as in the equivalent circuit of FIG. 7, although there is no problem in the case where the switch is turned on, when the switch is turned off, the nodes at both ends of the switch are not isolated from each other due to the parasitic capacitance component of the switch, which causes the impedance matching characteristics and leakage at the left and right nodes of the switch to affect the isolation or isolation performance.

Meanwhile, the above-described problems of the comparative example can be effectively solved by using the switch block with a high isolation degree that is simply structured according to the embodiment as described Referring to FIG. 2 or FIG. 13.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method for configuring a differential transmission having a switch, the method comprising:
   connecting a first switch in series to a first transmission line including a first distribution element having a first impedance, the first switch being disposed between a first end of the first transmission line and a second end of the first transmission line;
   connecting a second switch in series to a second transmission line including a second distribution element having a second impedance, the second switch being disposed between a first end of the second transmission line and a second end of the second transmission line;
   connecting a third switch between a second terminal of the first switch and a first terminal of the second switch; and
   connecting a fourth switch between a first terminal of the first switch and a second terminal of the second switch,
   wherein a second pair of the third and fourth switches are connected in a cross-coupled pair to cancel or offset off-capacitance of a first pair of the first and second switches, and
   wherein a switch block, including the first to fourth switches, is controlled to have one of states including an open state, a 0° phase state, a 180° phase, and a short state.

2. The method of claim 1, further comprising connecting control terminals of the switches of the first pair and control terminals of the switches of the second pair commonly to a power supply voltage terminal, respectively.

3. The method of claim 1, further comprising connecting a body part of one or more switches among the first to fourth switches to the ground or a power supply voltage depending on the type of a transistor constituting the corresponding switch.

4. The method of claim 1, wherein the first and second distribution elements are series inductors having a length of a predetermined ratio of a wavelength of a radio frequency.

5. The method of claim 1, wherein the differential transmission line is used for a phase shifter including a transmission line requiring a switch operation or used for a radio frequency (RF) front-end module including the phase shifter.

* * * * *